US012769095B2

(12) United States Patent
Miyoshi

(10) Patent No.: US 12,769,095 B2
(45) Date of Patent: Oct. 20, 2026

(54) IMAGE PICKUP APPARATUS THAT PERFORMS GIMBAL CONTROL

(71) Applicant: CANON KABUSHIKI KAISHA, Tokyo (JP)

(72) Inventor: Kaori Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 18/432,883

(22) Filed: Feb. 5, 2024

(65) Prior Publication Data

US 2024/0264414 A1 Aug. 8, 2024

(30) Foreign Application Priority Data

Feb. 8, 2023 (JP) ................................. 2023-017354

(51) Int. Cl.
*G02B 13/00* (2006.01)
*G02B 7/10* (2021.01)
*G02B 13/02* (2006.01)

(52) U.S. Cl.
CPC ............. *G02B 13/009* (2013.01); *G02B 7/10* (2013.01); *G02B 13/02* (2013.01)

(58) Field of Classification Search
CPC ........ G02B 13/009; G02B 13/02; G02B 7/10; G02B 7/102; G02B 7/001; H04N 23/55; H04N 23/69; H04N 23/68; H04N 23/682; H04N 23/685
USPC .......................................................... 359/683
See application file for complete search history.

(56) References Cited

U.S. PATENT DOCUMENTS

2019/0253596 A1* 8/2019 Wang ..................... B64U 10/13
2021/0231968 A1* 7/2021 Yu ......................... G02B 27/646

FOREIGN PATENT DOCUMENTS

JP 2017-211562 A 11/2017
JP 2018-533037 A 11/2018

* cited by examiner

*Primary Examiner* — Angela M. Medich
(74) *Attorney, Agent, or Firm* — Cowan, Liebowitz & Latman, P.C.

(57) ABSTRACT

An image pickup apparatus that can be reduced in weight and size while ensuring gimbal control with high accuracy. The image pickup apparatus comprises an image pickup device through which an optical axis of an optical lens passes, a zoom lens barrel, supported by a connection part, which changes a focal length by moving the optical lens in an optical axis direction, and a first drive device including one end to which the connection part is fixed, which rotates the zoom lens barrel about an axis substantially orthogonal to the optical axis via the connection part, wherein in the optical axis direction with reference to the image pickup device, as a center of gravity of an assembly including all components connected to the one end moves due to the focal length change, the connection part moves to follow a movement of the center of gravity.

10 Claims, 7 Drawing Sheets

IMAGE PICKUP APPARATUS THAT PERFORMS GIMBAL CONTROL

BACKGROUND OF THE INVENTION

Field of the Invention

The present invention relates to an image pickup apparatus that performs gimbal control.

Description of the Related Art

Conventionally, as a device capable of reducing a camera shake of a camera or intentionally changing the image pickup angle of view, for example, there is a so-called gimbal device capable of rotating a camera part in three axes as in a technique described in Published Japanese Translation of PCT International Publication (tokuhyo) No. 2018-533037. In such a gimbal device, in order to adapt to various shooting scenes, the camera part may include a zoom lens barrel that can be changed from a wide angle to a telephoto angle. In this case, when the center-of-gravity position of the zoom lens barrel moves depending on a focal length, the accuracy of gimbal control is affected. In response to this problem, for example, the occurrence of such a situation is prevented by a technique described in Japanese Laid-Open Patent Publication (kokai) No. 2017-211562. Specifically, the technique described in Japanese Laid-Open Patent Publication (kokai) No. 2017-211562 suppresses a change in the center-of-gravity position of the zoom lens barrel by moving a balance member in a direction opposite to a moving direction of the center of gravity of the zoom lens barrel, and prevents the accuracy of gimbal control from being affected.

However, in the technique described in Japanese Laid-Open Patent Publication (kokai) No. 2017-211562, the balance member and a movement mechanism thereof that are not originally necessary for the function of the camera are added to the zoom lens barrel. For this reason, the technique described in Japanese Laid-Open Patent Publication (kokai) No. 2017-211562 has a problem that a reduction in the weight and size of the camera is hindered.

SUMMARY OF THE INVENTION

The present invention provides an image pickup apparatus that can be reduced in weight and size while ensuring gimbal control with high accuracy.

Accordingly, the present invention provides an image pickup apparatus comprising an optical lens, an image pickup device through which an optical axis of the optical lens passes, a zoom lens barrel configured to change a focal length by moving the optical lens in a direction of the optical axis, a connection part configured to support the zoom lens barrel, and a first drive device including one end to which the connection part is fixed, and configured to rotate, via the connection part, the zoom lens barrel about a first axis substantially orthogonal to the optical axis, wherein in the direction of the optical axis with reference to the image pickup device, as a center of gravity of an assembly formed of all components connected to one end side of the first drive device moves due to the change in the focal length, the connection part moves to follow a direction of the movement of the center of gravity.

According to the present invention, it is possible to reduce the weight and size of the image pickup apparatus while ensuring gimbal control with high accuracy.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. However, configurations described in each following embodiment are merely examples, and the scope of the present invention is not limited by the configurations described in each embodiment. For example, each part forming the present invention can be replaced with any configuration capable of exhibiting a similar function. In addition, any components may be added. In addition, any two or more configurations (features) in each embodiment can also be combined.

Figure 1:
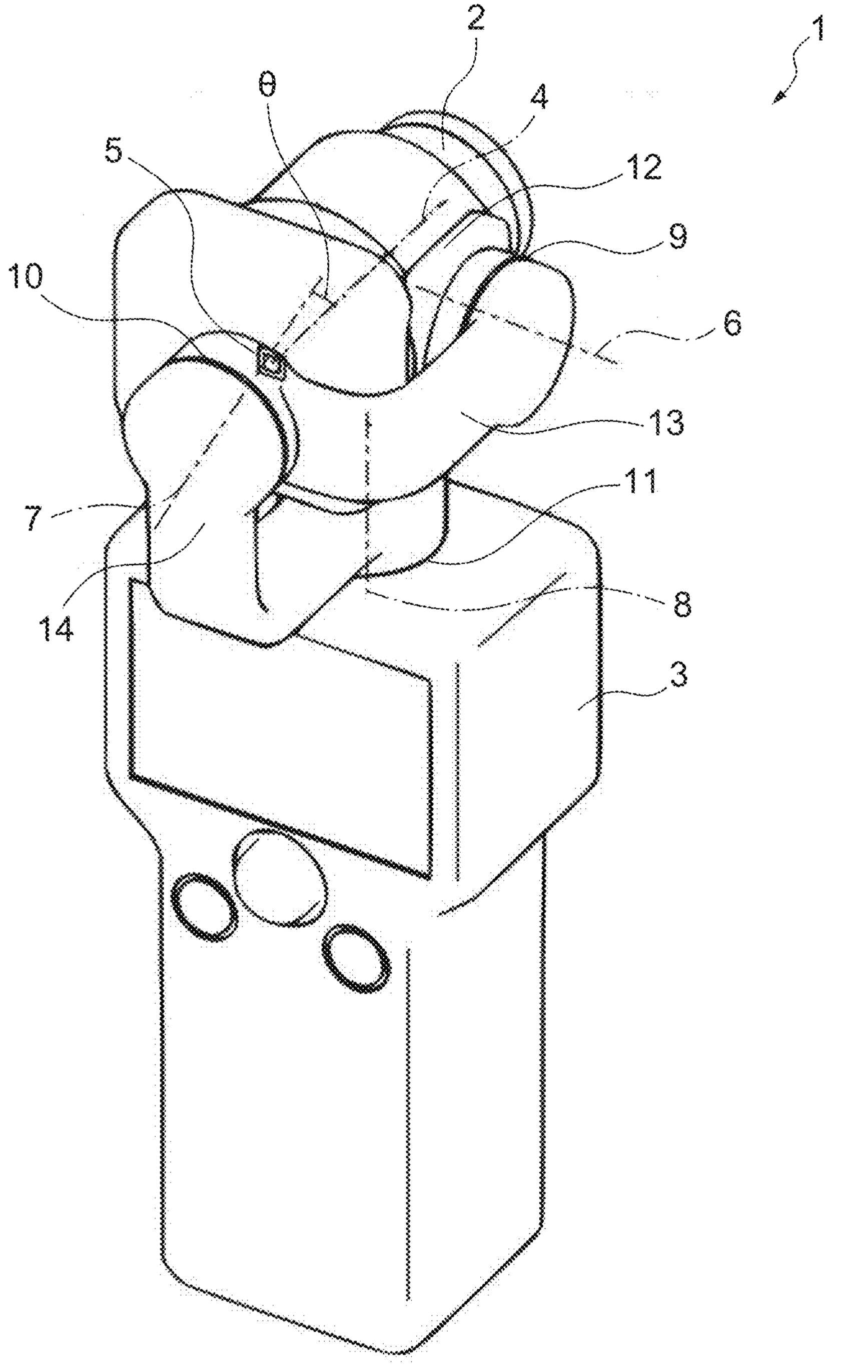
FIG. 1 is a perspective diagram of an image pickup apparatus according to a first embodiment.

Hereinafter, a first embodiment will be described with reference to FIGS. 1 to 4. FIG. 1 is a perspective diagram of an image pickup apparatus 1 according to the first embodiment. The image pickup apparatus 1 is a camera-integrated gimbal, and includes a zoom lens barrel 2 and a grip part 3. The zoom lens barrel 2 is capable of changing a focal length of the image pickup apparatus 1 by moving a plurality of optical lens groups, which are components of the zoom lens barrel 2, along an optical axis 4 of the zoom lens barrel 2. The optical axis 4 passes through an image pickup device 5 of the zoom lens barrel 2. The image pickup apparatus 1 is capable of rotating the zoom lens barrel 2 about three axes: a first axis 6, a second axis 7, and a third axis 8. An internal configuration of the zoom lens barrel 2 will be described later.

The image pickup apparatus 1 includes a first motor 9 (first drive device), a second motor 10, and a third motor 11. The first motor 9 is provided to rotate about the first axis 6 substantially orthogonal to the optical axis 4. The second motor 10 is provided to rotate about the second axis 7 that forms an angle θ of 0° to 45° with the optical axis 4 when viewed in the direction of the first axis 6. The third motor 11 provided to rotate about the third axis 8 substantially orthogonal to both the optical axis 4 and the first axis 6.

It should be noted that in the following description, one end of the first motor 9 indicates one of a fixed side and a movable side of the first motor 9. The other end of the first motor 9 indicates one of the movable side and the fixed side of the first motor 9. The definitions of "one end" and "the other end" are similar for the second motor 10 and the third motor 11, and are similar for a second motor 61 of a second embodiment (to be described later and refer to FIGS. 6 and 7). In addition, in the following description, the first motor 9, the second motor 10, and the third motor 11 are simply referred to as a "motor" when collectively referred to without distinction.

The image pickup apparatus 1 further includes a first connection part 12 (connection part), a second connection part 13, and a third connection part 14. The first connection part 12 is fixed to the one end of the first motor 9. The second connection part 13 is fixed to the other end of the first motor 9 and one end of the second motor 10. The third connection part 14 is fixed to the other end of the second motor 10 and one end of the third motor 11. The grip part 3 is fixed to the other end of the third motor 11.

The grip part 3 is provided with a liquid crystal monitor, an operating member, an operating button, and the like. The grip part 3 is further provided with members necessary for the image pickup apparatus 1, such as a drive board or a battery, as built-in components thereof, of which the detailed descriptions will be omitted. A photographer holds the image pickup apparatus 1 by gripping the grip part 3. The image pickup apparatus 1 controls the drive of the first motor 9, the second motor 10, and the third motor 11 such that when a camera shake of the photographer is to be corrected or the photographer intentionally changes the angle of view, the rotation angle of the zoom lens barrel 2 becomes a rotation angle corresponding to a movement caused by the correction of the camera shake and/or the change in the angle of view. As a result, in the image pickup apparatus 1, gimbal control is performed to eliminate the camera shake and smoothly change the angle of view, so that a high-quality image is obtained for both a still image and a moving image. At that time, the drive control of an engine or the motor, which gives a drive command to the motor, is performed on the drive board, of which the detailed description thereof will be omitted.

In general, in the image pickup apparatus 1, it is desirable that the first axis 6 that is the rotation center axis of the first motor 9 is at a position where the first axis 6 passes near the center of gravity of an assembly formed of all components connected to one side of the first motor 9, wherein examples of the components forming this assembly include the zoom lens barrel 2, the first connection part 12, and one end side portion of the first motor 9, and the like. Similarly, in the image pickup apparatus 1, it is desirable that the second axis 7 that is the rotation center axis of the second motor 10 is at a position where the second axis 7 passes near the center of gravity of an assembly formed of all components connected to one end side of the second motor 10, wherein examples of the components forming this assembly include the zoom lens barrel 2, the first connection part 12, the first motor 9, the second connection part 13, one end side portion of the second motor 10, and the like.

Similarly, in the image pickup apparatus 1, it is desirable that the third axis 8 that is the rotation center axis of the third motor 11 is at a position where the third axis 8 passes near the center of gravity of an assembly formed of all components connected to one end side of the third motor 11, wherein examples of the components forming this assembly include the zoom lens barrel 2, the first connection part 12, the first motor 9, the second connection part 13, the second motor 10, the third connection part 14, one end side portion of the third motor 11, and the like. It should be noted that in the following description, the first axis 6, the second axis 7, and the third axis 8 are referred to as the "rotation center axis of the motor", when collectively referred to without distinction.

In the image pickup apparatus 1, when the rotation center axis of the motor is at the above-described position, inertia during rotation of the motor is reduced, so that the motor drive is stabilized and accuracy is improved. Further, in the image pickup apparatus 1, since the motor does not require extra torque, the motor is also reduced in size. Therefore, in the image pickup apparatus 1, it is ideal that the rotation center axis of the motor passes through the center of gravity of the assembly formed of all the components connected to the one end side of the motor. It should be noted that in the following description, the assembly formed of all the components connected to the one end side of the motor may be abbreviated as an "assembly connected to the one end side of the motor".

However, when the focal length of the image pickup apparatus 1 is changed, the center-of-gravity position of the assembly connected to the one end side of the motor also moves along with the movement of members forming the zoom lens barrel 2. For this reason, if the positional relationship between the zoom lens barrel 2 and the motor is fixed, it is difficult to achieve a configuration in which the rotation center axis of the motor passes through the center of gravity of the assembly connected to the one end side of the motor without depending on the focal length of the image pickup apparatus 1. Therefore, the image pickup apparatus 1 is configured such that by a barrel configuration of the zoom lens barrel 2 to be described later, the rotation center axis of the motor passes through the center of gravity of the assembly connected to the one end side of the motor without depending on the focal length of the image pickup apparatus 1 even when the center-of-gravity position of the assembly connected to the one end side of the motor is moved.

Figure 2:
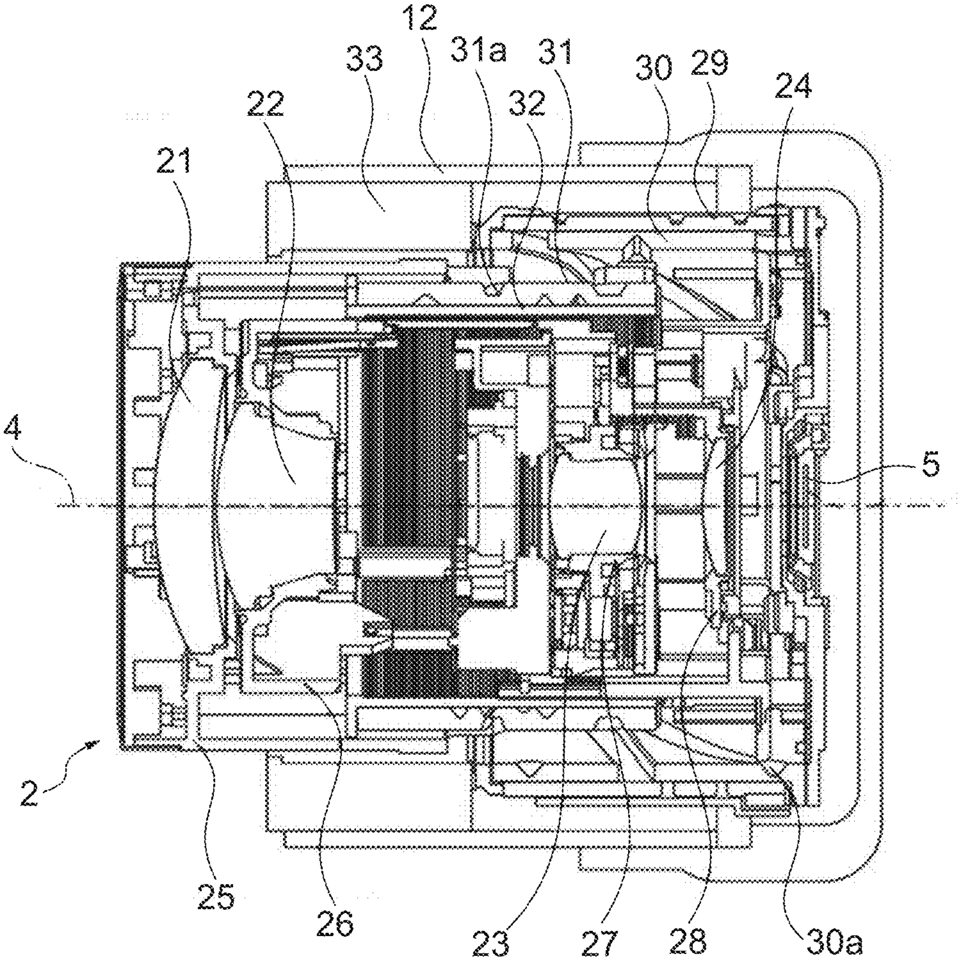
FIG. 2 is a cross-sectional diagram of a zoom lens barrel included in the image pickup apparatus of FIG. 1 in a wide-angle state.
Figure 3:
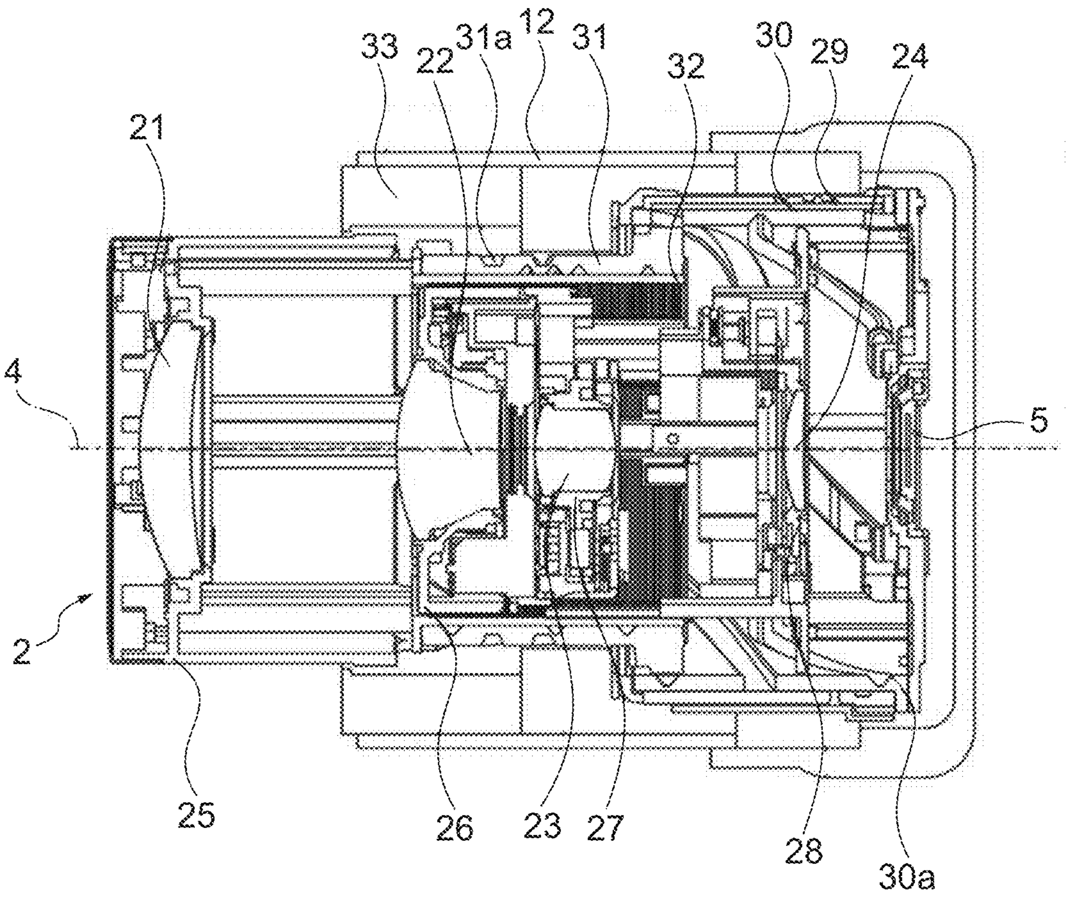
FIG. 3 is a cross-sectional diagram of the zoom lens barrel included in the image pickup apparatus of FIG. 1 in a telephoto state.

Next, a barrel configuration of the zoom lens barrel 2 will be described with reference to FIGS. 2 and 3. FIG. 2 is a cross-sectional diagram of the zoom lens barrel 2 when the zoom lens barrel 2 is in a wide-angle state. FIG. 3 is a cross-sectional diagram of the zoom lens barrel 2 when the zoom lens barrel 2 is in a telephoto state. As shown in FIGS. 2 and 3, the zoom lens barrel 2 includes a first optical lens group 21, a second optical lens group 22, a third optical lens group 23, and a fourth optical lens group 24 in addition to the image pickup device 5. In the zoom lens barrel 2, the first to fourth optical lens groups 21 to 24 (optical lenses) are optically designed to be able to change the focal length of the image pickup apparatus 1 by moving in the direction of the optical axis 4 to change the state between the wide-angle state in FIG. 2 and the telephoto state in FIG. 3.

The zoom lens barrel 2 further includes a first holding frame 25, a second holding frame 26, a third holding frame 27, and a fourth holding frame 28. The first holding frame 25 holds the first optical lens group 21. The second holding frame 26 holds the second optical lens group 22. The third holding frame 27 holds the third optical lens group 23. The fourth holding frame 28 holds the fourth optical lens group 24.

The zoom lens barrel 2 further includes a rotary barrel 29, a fixed barrel 30, a cam barrel 31, a linear guide barrel 32, and a movable ring 33. The rotary barrel 29 is a barrel that is rotatably held, and a cam groove is provided on an inner peripheral surface of the rotary barrel 29. The fixed barrel 30 is a barrel fixed to the image pickup device 5. The cam barrel 31 is a barrel that is movable in the direction of the optical axis 4, and cam grooves are provided on both an inner peripheral side and an outer peripheral side of the cam barrel 31. The linear guide barrel 32 is a barrel that is movable in the direction of the optical axis 4 in conjunction with the cam barrel 31, and is restricted by key fitting to the cam barrel 31 so as not to rotate.

The movable ring 33 is a ring that is movable in the direction of the optical axis 4, and is restricted by key fitting to the cam barrel 31 so as not to rotate. An outer peripheral surface of the movable ring 33 is fixed to one end of the first connection part 12. Accordingly, the zoom lens barrel 2 is connected to the one end of the first connection part 12 via the outer peripheral surface of the movable ring 33 thereof. On the other hand, as described above, the one end of the first motor 9 is fixed to the other end of the first connection part 12. In this manner, the first connection part 12 supports the zoom lens barrel 2 via the movable ring 33 so as to surround the zoom lens barrel 2 in a radial direction of the zoom lens barrel 2. In addition, the first motor 9 is capable of rotating, via the first connection part 12, the zoom lens barrel 2 about the first axis 6 substantially orthogonal to the optical axis 4. The second motor 10 is capable of rotating the zoom lens barrel 2 about the second axis 7 via the first connection part 12 and the second connection part 13. The third motor 11 is capable of rotating the zoom lens barrel 2 about the third axis 8 via the first connection part 12, the second connection part 13, and the third connection part 14.

In order to change the focal length of the image pickup apparatus 1, in the zoom lens barrel 2, the rotary barrel 29 is rotated about the optical axis 4 by a drive unit (not shown). The rotary barrel 29 is key-fitted to the cam barrel 31. For this reason, the cam barrel 31 rotates in conjunction with the rotary barrel 29. At that time, a follower pin (not shown) provided on the cam barrel 31 engages with a cam groove 30*a* provided on an inner peripheral surface of the fixed barrel 30. Accordingly, the cam barrel 31 moves in the direction of the optical axis 4. The first holding frame 25, the second holding frame 26, the third holding frame 27, and the movable ring 33 are held not to rotate by being key-fitted to the linear guide barrel 32. In addition, when the cam barrel 31 rotates as described above, the first holding frame 25, the second holding frame 26, the third holding frame 27, and the movable ring 33 move by independent movement amounts according to the trajectory of a plurality of cam grooves provided on an inner peripheral surface or an outer peripheral surface of the cam barrel 31.

At that time, a follower pin (not shown) provided on the first holding frame 25 engages with the cam grooves provided on the cam barrel 31, whereby the first holding frame 25 moves in the direction of the optical axis 4. This configuration is similar for the second holding frame 26, the third holding frame 27, and the fourth holding frame 28. Accordingly, the first optical lens group 21 held by the first holding frame 25, the second optical lens group 22 held by the second holding frame 26, the third optical lens group 23 held by the third holding frame 27, and the fourth optical lens group 24 held by the fourth holding frame 28 each moves in the direction of the optical axis 4.

In addition, a follower pin (not shown) provided on the movable ring 33 engages with a cam groove 31*a* provided on the outer peripheral surface of the cam barrel 31. The movable ring 33 moves in the direction of the optical axis 4 in conjunction with the first to fourth optical lens groups 21 to 24 through such cam follower engagement, in the zoom lens barrel 2. It should be noted that the fourth holding frame 28 is configured to be movable in the direction of the optical axis 4 independently of the first holding frame 25, the second holding frame 26, and the third holding frame 27 by another drive unit (not shown), in addition to being moved by the cam follower engagement. Accordingly, the fourth optical lens group 24 held by the fourth holding frame 28 moves in the direction of the optical axis 4 and functions as a focus lens.

In the zoom lens barrel 2, when the focal length of the image pickup apparatus 1 is changed, the first to fourth optical lens groups 21 to 24 and the first to fourth holding frames 25 to 28 move in the direction of the optical axis 4 due to the above-described barrel configuration. This point is similar for the cam barrel 31, the linear guide barrel 32, and the movable ring 33. In this manner, the zoom lens barrel 2 changes the state between the wide-angle state in FIG. 2 and the telephoto state in FIG. 3.

Figure 4:
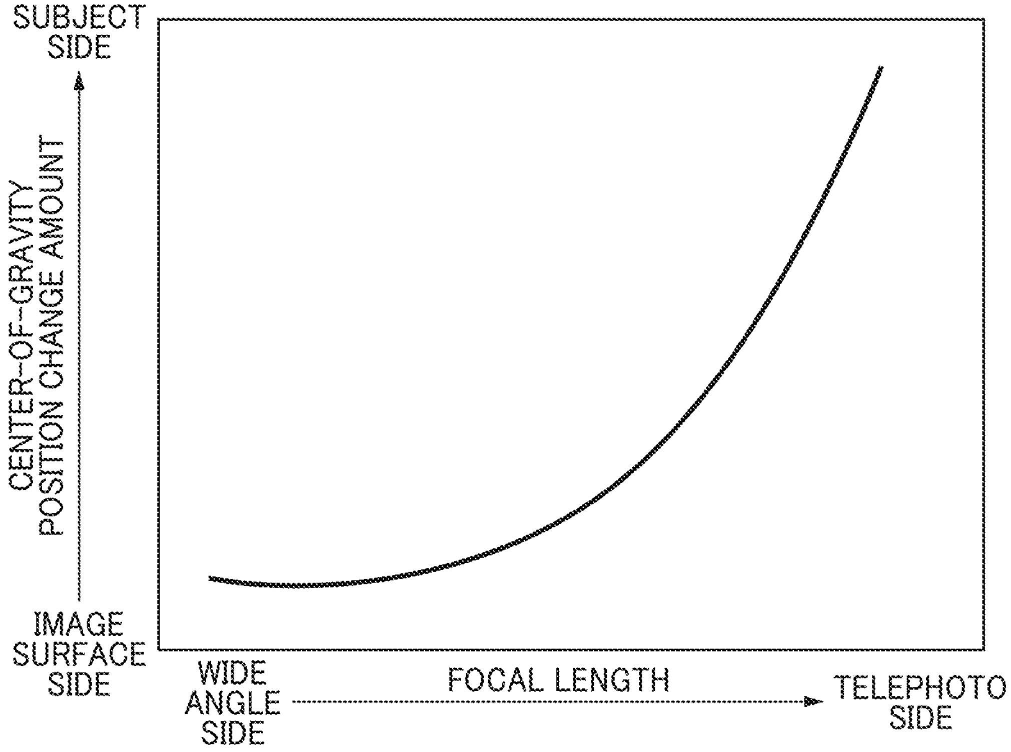
FIG. 4 is a graph showing a relationship between a focal length and a center-of-gravity position change amount of an assembly connected to one end side of a first motor in the direction of an optical axis of the image pickup apparatus of FIG. 1.

FIG. 4 is a graph showing a relationship between the focal length and a center-of-gravity position change amount of the assembly connected to the one end side of the first motor 9 in the direction of the optical axis 4 of the image pickup apparatus 1. When the focal length of the image pickup apparatus 1 is changed, the center-of-gravity position of the assembly connected to the one end side of the first motor 9 changes along with the movement of the members forming the zoom lens barrel 2. In FIG. 4, the center-of-gravity position change amount of the assembly connected to the one end side of the first motor 9 is shown with a reference to the image pickup device 5. According to FIG. 4, it can be seen that as the focal length of the image pickup apparatus 1 increases, the center-of-gravity position of the assembly connected to the one end side of the first motor 9 moves from an image surface side to a subject side with a reference to the image pickup device 5, in the direction of the optical axis 4. That is, as the zoom lens barrel 2 changes the state from the wide-angle state in FIG. 2 to the telephoto state in FIG. 3, the center-of-gravity position of the assembly connected to the one end side of the first motor 9 moves from the image surface side to the subject side with a reference to the image pickup device 5 in the direction of the optical axis 4.

As described above, the movable ring 33 is movable in the direction of the optical axis 4 by the cam groove 31*a* of the cam barrel 31. The cam groove 31*a* is provided on the cam barrel 31 such that the movement amount of the movable ring 33 with reference to the image pickup device 5 changes along substantially the same trajectory as the center-of-gravity position change amount shown in FIG. 4 as the focal length of the image pickup apparatus 1 changes. Accordingly, when the focal length of the image pickup apparatus 1 is changed, the movement amount of the movable ring 33 changes substantially in the same manner as the center-of-gravity position change amount of the assembly connected to the one end side of the first motor 9, with reference to the image pickup device 5.

In addition, the first motor 9 is fixed to the movable ring 33 via the first connection part 12. For this reason, when the focal length of the image pickup apparatus 1 is changed, similarly, the movement amount of the first motor 9 with reference to the image pickup device 5 also changes substantially in the same manner as the center-of-gravity position change amount of the assembly connected to the one end side of the first motor 9. Therefore, when the center of gravity of the assembly connected to the one end side of the first motor 9 moves with reference to the image pickup device 5 in the direction of the optical axis 4 due to the change in the focal length, the movable ring 33, namely, the first connection part 12 moves to follow the direction of the movement of the center of gravity of the assembly connected to the one end side of the first motor 9. As a result, the first axis 6 that is the rotation center axis of the first motor 9 is located at a position passing through the center of gravity of the assembly connected to the one end side of the first motor 9 without depending on the focal length of the image pickup apparatus 1. When this positional relationship is established, a similar positional relationship is established for the second motor 10 or the third motor 11.

Namely, regarding the second motor 10 fixed to the first motor 9 via the second connection part 13, the second axis 7 that is the rotation center axis of the second motor 10 passes through the center of gravity of the assembly connected to the one end side of the second motor 10 without depending on the focal length of the image pickup apparatus 1. Regarding the third motor 11 fixed to the second motor 10 via the third connection part 14, the third axis 8 that is the rotation center axis of the third motor 11 passes through the center of gravity of the assembly connected to the one end side of the third motor 11 without depending on the focal length of the image pickup apparatus 1. In this manner, the image pickup apparatus 1 has a configuration in which even when the members forming the zoom lens barrel 2 move, the rotation center axis of the motor passes through the center of gravity of the assembly formed of all the components connected to the one end side of the motor.

As described above, the image pickup apparatus 1 is capable of locating the center of gravity of the assembly, which is formed of all the components connected to the one end side of the motor, on the rotation center axis of the motor without adopting the balance member used in the technique described in Japanese Laid-Open Patent Publication (kokai) No. 2017-211562, even when the focal length of the image pickup apparatus 1 is changed. Accordingly, it is possible to reduce the weight and size of the image pickup apparatus 1 while ensuring gimbal control with high accuracy.

Figure 6:
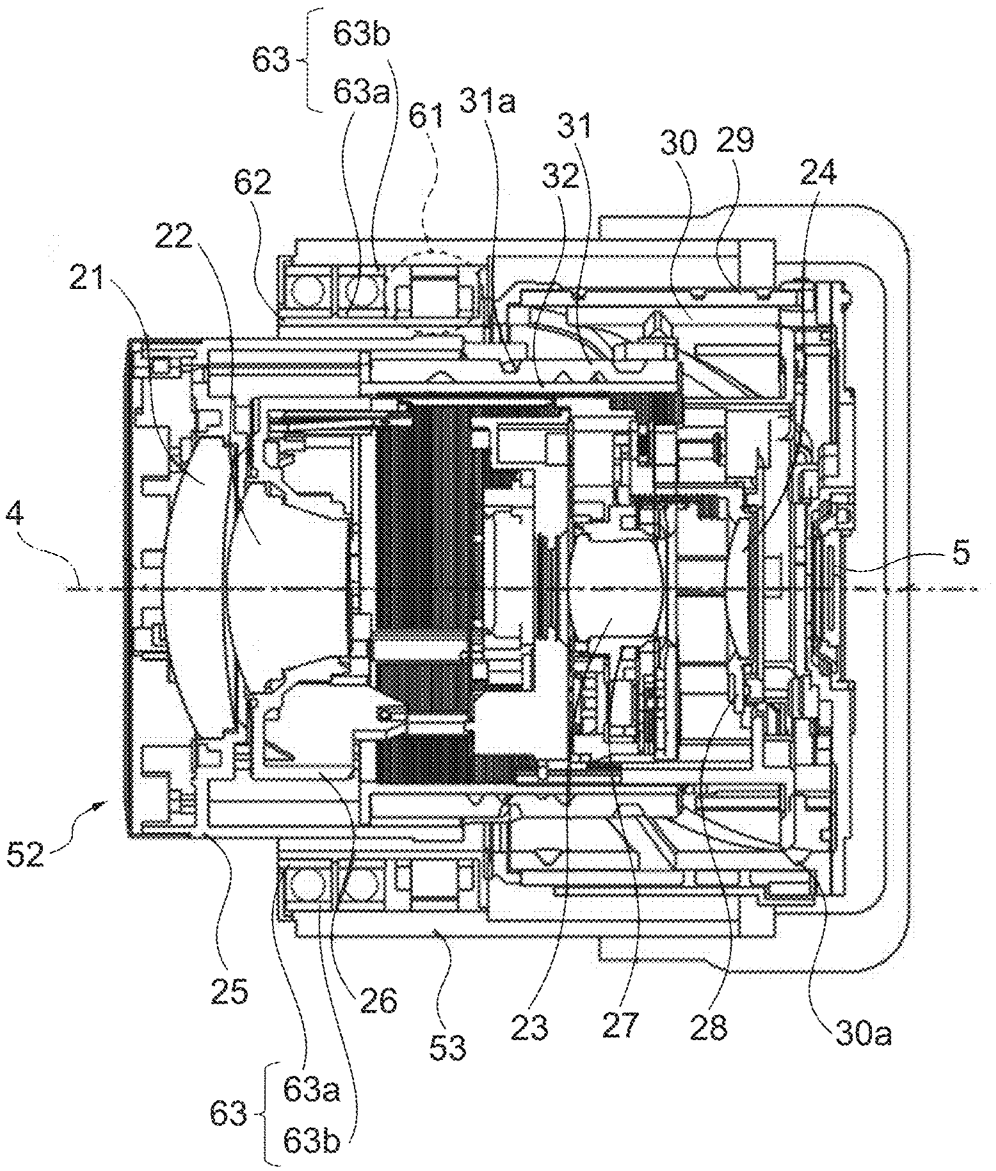
FIG. 6 is a cross-sectional diagram of a zoom lens barrel included in the image pickup apparatus of FIG. 5 in a wide-angle state.
Figure 7:
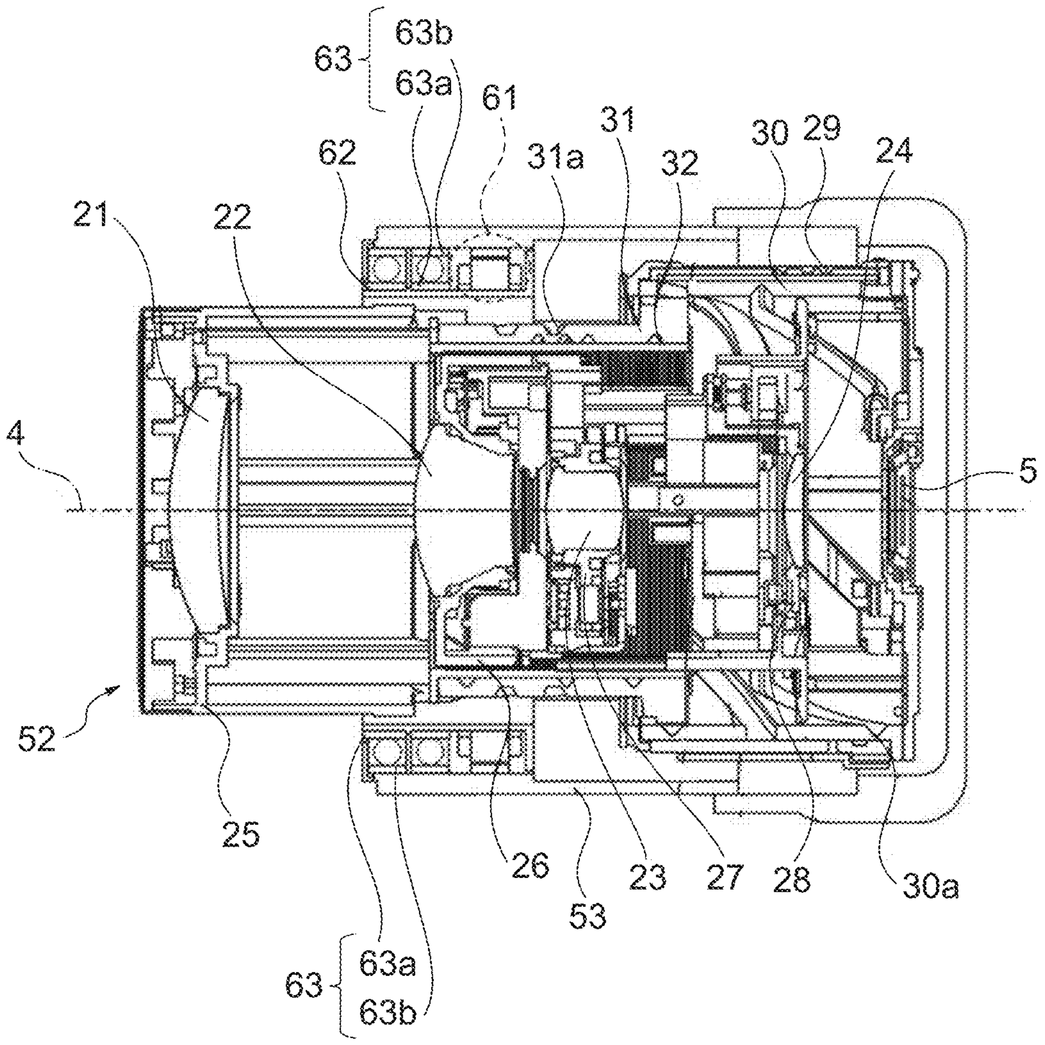
FIG. 7 is a cross-sectional diagram of the zoom lens barrel included in the image pickup apparatus of FIG. 5 in a telephoto state.

Hereinafter, a second embodiment will be described with reference to FIGS. 5 to 7. It should be noted that the same reference signs are assigned to the same or similar configurations as those in the first embodiment, and duplicate descriptions will be omitted. In the first embodiment, the first motor 9 having the first axis 6 as a rotation center axis, the second motor 10 having the second axis 7 as a rotation center axis, and the third motor 11 having the third axis 8 as a rotation center axis are connected to the zoom lens barrel 2 in this order. On the other hand, in the second embodiment, a further reduction in the size of the device than in the first embodiment is achieved by differing the connection order of the motors from that of the first embodiment.

Figure 5:
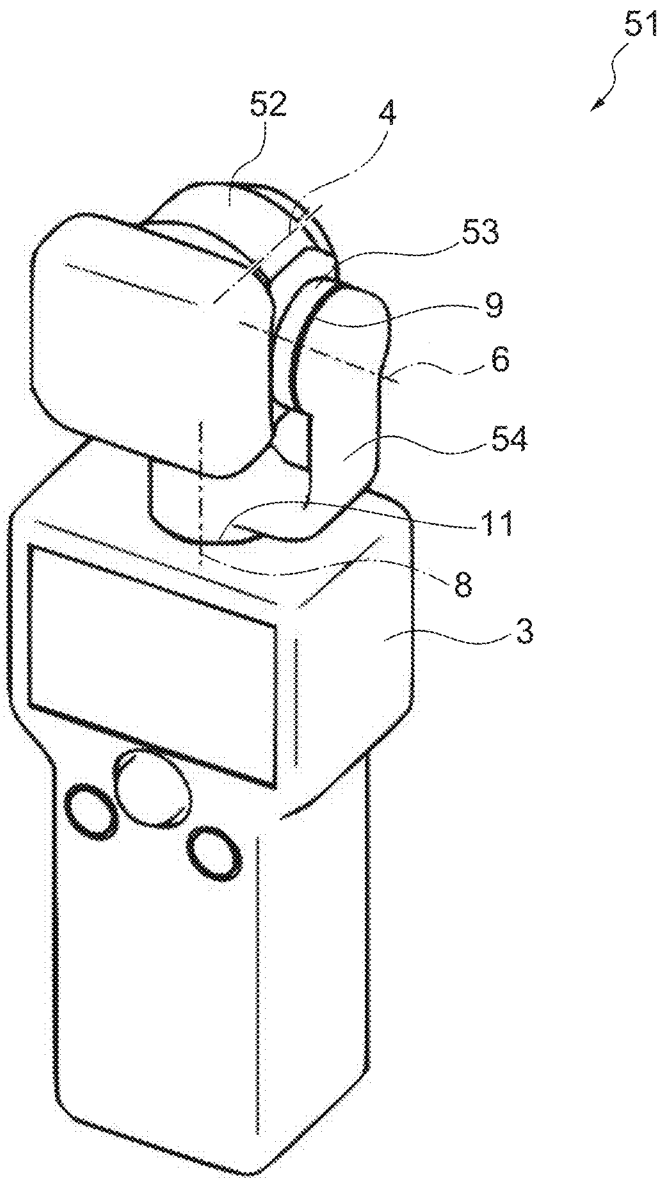
FIG. 5 is a perspective diagram of an image pickup apparatus according to a second embodiment.

FIG. 5 is a perspective diagram of an image pickup apparatus 51 according to the second embodiment. FIG. 6 is a cross-sectional diagram of a zoom lens barrel 52 when the zoom lens barrel 52 is in a wide-angle state. FIG. 7 is a cross-sectional diagram of the zoom lens barrel 52 when the zoom lens barrel 52 is in a telephoto state. The image pickup apparatus 51 is a camera-integrated gimbal, and includes the zoom lens barrel 52 and the grip part 3. The zoom lens barrel 52 is capable of changing a focal length of the image pickup apparatus 51 by moving a plurality of optical lens groups, which are components of the zoom lens barrel 52, along the optical axis 4 of the zoom lens barrel 52. In the zoom lens barrel 52, a mechanism that moves the optical lens groups thereof is similar to that of the zoom lens barrel 2 of the first embodiment.

The image pickup apparatus 51 is capable of rotating the zoom lens barrel 52 about three axes: the optical axis 4, the first axis 6, and the third axis 8. The image pickup apparatus 51 includes the second motor 61 (second drive device) (FIGS. 6 and 7), the first motor 9, and the third motor 11. The second motor 61 is a hollow drive device, and is provided to be rotatable about the optical axis 4 in a manner as described later. The second motor 61 includes a coil and a magnet, and obtains a rotational force when the coil is energized. It should be noted that the detailed description of the second motor 61 is omitted. In addition, in the following description, the second motor 61, the first motor 9, and the third motor 11 are simply referred to as a "motor" when collectively referred to without distinction. In addition, the optical axis 4 that is the rotation center axis of the second motor 61, the first axis 6 that is the rotation center axis of the first motor 9, and the third axis 8 that is the rotation center axis of the third motor 11 are referred to as a "rotation center axis of the motor", when collectively referred to without distinction.

The image pickup apparatus 51 further includes a first connection part 53 (connection part) and a third connection part 54. The first connection part 53 is fixed to the one end of the first motor 9. The third connection part 54 is fixed to the other end of the first motor 9 and the one end of the third motor 11. The image pickup apparatus 51 controls the drive of the second motor 61, the first motor 9, and the third motor 11 such that when a camera shake of a photographer is to be corrected or the photographer intentionally changes the angle of view, the rotation angle of the zoom lens barrel 52 becomes a rotation angle corresponding to a movement caused by the correction of the camera shake and/or the change in the angle of view. As a result, in the image pickup apparatus 51, gimbal control is performed to eliminate the camera shake and smoothly change the angle of view, so that a high-quality image is obtained for both a still image and a moving image.

In the image pickup apparatus 51, similarly to the image pickup apparatus 1 according to the first embodiment, it is ideal that the rotation center axis of the motor passes through the center of gravity of an assembly connected to the one end side of the motor. Therefore, in the zoom lens barrel 52, using a barrel configuration similar to that of the first embodiment, when the focal length of the image pickup apparatus 51 is changed, the movement amount of a movable ring 62 (FIGS. 6 and 7) with reference to the image pickup device 5 changes along substantially the same trajectory as the center-of-gravity position change amount shown in FIG. 4 as the focal length of the image pickup apparatus 51 changes. Therefore, when the focal length of the image pickup apparatus 51 is changed, the movement amount of the movable ring 62 changes substantially in the same manner as the center-of-gravity position change amount of an assembly connected to the one end side of the first motor 9, with reference to the image pickup device 5. That is, in the barrel configuration of the zoom lens barrel 52, the movable ring 62 corresponds to the movable ring 33 of the first embodiment. Therefore, the movable ring 62 is a ring that is movable in the direction of the optical axis 4, and is restricted by key fitting to the cam barrel 31 so as not to rotate.

Differences between the barrel configuration of the zoom lens barrel 52 of the second embodiment and the barrel configuration of the zoom lens barrel 2 of the first embodiment will be described below. As shown in FIGS. 6 and 7, the one end of the second motor 61 that is a hollow drive device is fixed to an outer peripheral surface of the movable ring 62. It should be noted that the optical axis 4 that is the rotation center axis of the second motor 61 is located at a position passing through the center of gravity of an assembly connected to the one end side of the second motor 61. On the other hand, the one end of the first connection part 53 is fixed to the other end of the second motor 61. Accordingly, the movable ring 62 and the first connection part 53 are connected to each other via the second motor 61. It should be noted that as described above, the one end of the first motor 9 is fixed to the other end of the first connection part 53.

The zoom lens barrel 52 includes two bearings 63. Each of the bearings 63 holds an inner ring 63*a* and an outer ring 63*b* in a relatively rotatable manner. The bearings 63 are disposed side by side in the direction of the optical axis 4 coaxially with the second motor 61. Accordingly, the bearings 63 are disposed to overlap the second motor 61 when viewed in the direction of the optical axis 4. The inner ring 63*a* of each bearing 63 is fixed to the outer peripheral surface of the movable ring 62. The outer ring 63*b* of each bearing 63 is fixed to the one end of the first connection part 53. Accordingly, the movable ring 62 and the first connection part 53 are connected to each other via the bearings 63. In addition, the first connection part 53 supports the zoom lens barrel 52 via the second motor 61, the bearings 63, and the movable ring 62 so as to surround the zoom lens barrel 52 in a radial direction of the zoom lens barrel 52.

It should be noted that as described above, the one end of the second motor 61 is fixed to the outer peripheral surface of the movable ring 62 to which the inner ring 63*a* of each bearing 63 is fixed, while the other end of the second motor 61 is fixed to the one end of the first connection part 53 to which the outer ring 63*b* of each bearing 63 is fixed. Accordingly, in each bearing 63, a driving force for the relative rotation of the inner ring 63*a* and the outer ring 63*b* is provided by the second motor 61. With such a barrel configuration, the second motor 61 and the bearings 63 are capable of rotating the zoom lens barrel 52 about the optical axis 4.

In addition, in the zoom lens barrel 52, the second motor 61, the movable ring 62, the bearings 63, and the first connection part 53 move integrally, with respect to the direction of the optical axis 4, with reference to the image pickup device 5. In addition, the first motor 9 is fixed to the first connection part 53. For this reason, the movement amount of the first motor 9 with reference to the image pickup device 5 changes in a similar manner to the movement amount of the movable ring 62 with reference to the image pickup device 5. Namely, when the focal length of the image pickup apparatus 51 is changed, the movement amount of the first motor 9 with reference to the image pickup device 5 changes substantially in the same manner as the center-of-gravity position change amount of the assembly connected to the one end side of the first motor 9.

As a result, the first axis 6 that is the rotation center axis of the first motor 9 is located at a position passing through the center of gravity of the assembly connected to the one end side of the first motor 9 without depending on the focal length of the image pickup apparatus 51. When this positional relationship is established, a similar positional relationship is established for the third motor 11. Namely, regarding the third motor 11 fixed to the first motor 9 via the third connection part 54, the third axis 8 that is the rotation center axis of the third motor 11 passes through the center of gravity of an assembly connected to the one end side of the third motor 11 without depending on the focal length of the image pickup apparatus 51. In this manner, the image pickup apparatus 51 has a configuration in which even when members forming the zoom lens barrel 52 move, the rotation center axis of the motor passes through the center of gravity of the assembly formed of all components connected to the one end side of the motor, which makes it possible to ensure gimbal control with high accuracy.

In addition, in the barrel configuration of the zoom lens barrel 52, the movable ring 62 is rotated about the optical axis 4 by the second motor 61 and the bearings 63. At that time, the first to fourth optical lens groups 21 to 24, the first to fourth holding frames 25 to 28, the rotary barrel 29, the fixed barrel 30, the cam barrel 31, and the linear guide barrel 32 rotate about the optical axis 4 integrally with the movable ring 62. That is, the second motor 61 of the second embodiment corresponds to the second motor 10 of the first embodiment. In this manner, in the second embodiment, the second motor 10 of the first embodiment is replaced with the second motor 61, which make it possible to omit a connection part required to provide the second motor 10, namely, a member corresponding to the second connection part 13 of the first embodiment. Accordingly, the image pickup apparatus 51 according to the second embodiment is further reduced in size than the image pickup apparatus 1 according to the first embodiment by eliminating the second connection part 13 greatly protruding toward a back surface side (image surface side) of the zoom lens barrel 2 of the first embodiment.

It should be noted that in the second embodiment, the second motor 61 having the optical axis 4 as a rotation center axis, the first motor 9 having the first axis 6 as a rotation center axis, and the third motor 11 having the third axis 8 as a rotation center axis are connected to the zoom lens barrel 52 in this order. In addition, when the center of gravity of the assembly connected to the one end side of the first motor 9 moves with reference to the image pickup device 5 in the direction of the optical axis 4 due to a change in the focal length, the movable ring 62, namely, the first connection part 53 moves to follow the direction of the movement of the center of gravity of the assembly connected to the one end side of the first motor 9. In addition, in the second embodiment, the second motor 61 and the bearings 63 are provided, and whereby only the width of the second motor 61 or the bearings 63 needs to be provided in the radial direction instead of the width of the second motor 10 of the first embodiment. Therefore, the size of the zoom lens barrel 52 of the second embodiment in the radial direction can be reduced compared to the zoom lens barrel 2 of the first embodiment.

The preferred embodiments of the present invention have been described above; however, the present invention is not limited to each embodiment described above, and various modifications and changes can be made without departing the concept of the present invention. For example, the barrel configurations of the zoom lens barrels 2 and 52 may be any configuration as long as the movement amounts of the movable rings 33 and 62 with reference to the image pickup device 5 are capable of changing substantially in the same manner as the center-of-gravity position change amount shown in FIG. 4, when the focal length is to be changed. In addition, in the second embodiment, a structure in which the second motor 61 and the bearings 63 rotate the zoom lens barrel 52 about the second axis 7 substantially parallel to the optical axis 4, can be adopted.

In addition, in the second embodiment, the second motor 61 is not necessarily a hollow motor and may be any drive device as long as the second motor 61 is capable of rotating the zoom lens barrel 52 about the optical axis 4 or the second axis 7 substantially parallel to the optical axis 4. In addition, in the second embodiment, the bearings 63 may be omitted as long as the zoom lens barrel 52 is rotatable about the optical axis 4 or the second axis 7 substantially parallel to the optical axis 4 only by the second motor 61.

In addition, in each embodiment described above, the rotation center axis of the motor passes through the center of gravity of the assembly, which is formed of all the components connected to the one end side of the motor, in the direction of the optical axis 4; however, the present invention is not limited to such a configuration. For example, the connection parts may be configured to move when the center-of-gravity position of the assembly connected to the one end side of the motor moves in the direction of the optical axis 4, such that a difference between the position of the rotation center axis of the motor and the center-of-gravity position is not larger than before the center-of-gravity position moves. Alternatively, the connection parts may be configured to move when the center-of-gravity position of the assembly connected to the one end side of the motor moves in the direction of the optical axis 4, such that a difference between the position of the rotation center axis of the motor and the center-of-gravity position is within a predetermined range. With any of these configurations, gimbal control with higher accuracy can be achieved than a configuration in which the connection parts do not move.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-017354, filed Feb. 8, 2023, which is hereby incorporated by reference wherein in its entirety.

What is claimed is:

1. An image pickup apparatus comprising:

an optical lens;

an image pickup device through which an optical axis of the optical lens passes;

a zoom lens barrel configured to change a focal length by moving the optical lens in a direction of the optical axis;

a connection part configured to support the zoom lens barrel; and a first drive device including one end to which the connection part is fixed, and configured to rotate, via the connection part, the zoom lens barrel about a first axis substantially orthogonal to the optical axis, wherein in the direction of the optical axis with reference to the image pickup device, as a center of gravity of an assembly formed of all components connected to one end side of the first drive device moves due to the change in the focal length, the connection part moves to follow a direction of the movement of the center of gravity, and wherein the zoom lens barrel includes a movable ring connected to the connection part.

2. The image pickup apparatus according to claim 1, wherein in the direction of the optical axis with reference to the image pickup device, as the center of gravity moves due to the change in the focal length, the connection part moves such that the first axis passes through the center of gravity.

3. The image pickup apparatus according to claim 1, wherein in the direction of the optical axis with reference to the image pickup device, as the center of gravity moves due to the change in the focal length, the connection part moves such that a difference between a position of the center of gravity and a position of the first axis is not larger than before the position of the center of gravity moves.

4. The image pickup apparatus according to claim 1, wherein in the direction of the optical axis with reference to the image pickup device, as the center of gravity moves due to the change in the focal length, the connection part moves such that a difference between a position of the center of gravity and a position of the first axis is within a predetermined range.

5. The image pickup apparatus according to claim 1, wherein the movable ring moves in the direction of the optical axis in conjunction with the optical lens through a cam follower engagement, in the zoom lens barrel.

6. The image pickup apparatus according to claim 1, wherein the connection part is connected to an outer peripheral surface of the movable ring.

7. The image pickup apparatus according to claim 1 further comprising a second drive device configured to rotate the zoom lens barrel about the optical axis or a second axis substantially parallel to the optical axis, wherein the movable ring and the connection part are connected to each other via the second drive device.

8. The image pickup apparatus according to claim 7, further comprising a bearing including an inner ring fixed to the movable ring and an outer ring fixed to the connection part, wherein the movable ring and the connection part are connected to each other via the bearing.

9. The image pickup apparatus according to claim 8, wherein the inner ring of the bearing is fixed to an outer peripheral surface of the movable ring.

10. The image pickup apparatus according to claim 9, wherein the second drive device and the bearing are disposed to overlap each other when viewed in the direction of the optical axis.

* * * * *